United States Patent
Kiok et al.

(10) Patent No.: US 11,153,612 B2
(45) Date of Patent: *Oct. 19, 2021

(54) IMAGE SAMPLING FROM MULTICAST STREAMS

(71) Applicant: Comcast Cable Communications, LLC, Philadelphia, PA (US)

(72) Inventors: Joseph Kiok, Arcadia, CA (US); Kevin Christopher Flanagan, Centennial, CO (US); Gregory Allen Broome, Broomfield, CO (US); Richard Joseph Fliam, Greenwood Village, CO (US); Sam Schwartz, Penn Valley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,290

(22) Filed: Dec. 24, 2014

(65) Prior Publication Data

US 2015/0181261 A1 Jun. 25, 2015

Related U.S. Application Data

(63) Continuation of application No. 13/290,441, filed on Nov. 7, 2011, now Pat. No. 8,949,892.

(Continued)

(51) Int. Cl.
*H04N 21/231* (2011.01)
*H04N 21/2362* (2011.01)
(Continued)

(52) U.S. Cl.
CPC ... *H04N 21/23109* (2013.01); *H04N 21/2362* (2013.01); *H04N 21/254* (2013.01);
(Continued)

(58) Field of Classification Search
CPC ......... H04N 21/23109; H04N 21/2362; H04N 21/254; H04N 21/26283; H04N 21/4314;
(Continued)

(56) References Cited

U.S. PATENT DOCUMENTS 6,732,371 B1 5/2004 Lee et al.
7,552,460 B2 6/2009 Goldman
(Continued)

FOREIGN PATENT DOCUMENTS

EP 2 237 556 A1 10/2010
WO 2007/011136 A1 1/2007

OTHER PUBLICATIONS

Extended European Search report, EP 12154432.4, dated Jul. 10, 2012.
(Continued)

*Primary Examiner* — Oschta I Montoya
(74) *Attorney, Agent, or Firm* — Banner & Witcoff, Ltd.

(57) ABSTRACT

Images may be periodically captured from each of a plurality of content streams comprising programs. Each of the content streams may be associated with capture parameters. The capture parameters may include information on how frequently images from the stream may be captured. The captured images may be made available to various clients for various uses, such as for display of a schedule of available programs.

25 Claims, 9 Drawing Sheets

Related U.S. Application Data

(60) Provisional application No. 61/442,628, filed on Feb. 14, 2011.

(51) Int. Cl.

| | | |
|---|---|---|
| *H04N 21/254* | (2011.01) | |
| *H04N 21/262* | (2011.01) | |
| *H04N 21/431* | (2011.01) | |
| *H04N 21/81* | (2011.01) | |
| *H04N 21/472* | (2011.01) | |
| *H04N 21/482* | (2011.01) | |

(52) U.S. Cl.
CPC ... *H04N 21/26283* (2013.01); *H04N 21/4314* (2013.01); *H04N 21/4316* (2013.01); *H04N 21/47202* (2013.01); *H04N 21/482* (2013.01); *H04N 21/8153* (2013.01)

(58) Field of Classification Search
CPC ........... H04N 21/8153; H04N 21/4316; H04N 21/47202; H04N 21/482
See application file for complete search history.

(56) References Cited

U.S. PATENT DOCUMENTS

| | | | |
|---|---|---|---|
| 7,757,252 | B1 | 7/2010 | Agasse |
| 7,782,365 | B2 | 8/2010 | Levien et al. |
| 8,381,249 | B2 | 2/2013 | Rasanen et al. |
| 8,776,124 | B2 | 7/2014 | Jin et al. |
| 2002/0144276 | A1* | 10/2002 | Radford ............ H04N 7/17318 725/87 |
| 2003/0014752 | A1 | 1/2003 | Zaslaysky et al. |
| 2005/0114885 | A1 | 5/2005 | Shikata et al. |
| 2005/0240964 | A1* | 10/2005 | Barrett ............... H04N 7/17318 725/44 |
| 2006/0039481 | A1* | 2/2006 | Shen .............. H04N 21/234363 375/240.25 |
| 2006/0236251 | A1 | 10/2006 | Kataoka et al. |
| 2008/0127271 | A1* | 5/2008 | Zriny ................. H04N 7/17318 725/46 |
| 2009/0094642 | A1 | 4/2009 | Hobson |
| 2009/0328100 | A1 | 12/2009 | Horiguchi |
| 2010/0031282 | A1 | 2/2010 | Torimaru |
| 2010/0095319 | A1* | 4/2010 | Tran ...................... H04H 60/31 725/14 |
| 2010/0242080 | A1* | 9/2010 | Henry .................. H04N 5/4401 725/117 |
| 2010/0251318 | A1 | 9/2010 | Simoes Rodrigues et al. |
| 2011/0162008 | A1* | 6/2011 | Aldrey ................ H04N 21/235 725/40 |
| 2011/0296456 | A1* | 12/2011 | Pandala ............. H04N 5/44543 725/34 |
| 2012/0060094 | A1 | 3/2012 | Irwin et al. |
| 2012/0117599 | A1* | 5/2012 | Jin ................... H04N 21/41407 725/41 |

OTHER PUBLICATIONS

European Summons to Oral Proceedings—EP Appl. 12154432.4—dated Apr. 8, 2016.
European Office Action, EP Application 12154432.4, dated Feb. 9, 2015.
Response to European Office Action—EP 12154432.4—dated Aug. 11, 2015.
Nov. 30, 2017—Canadian Office Action—CA 2767906.
Jan. 17, 2019—Canadian Office Action—2,767, 906.

\* cited by examiner

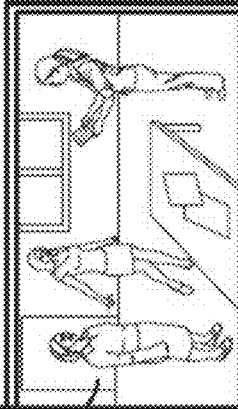
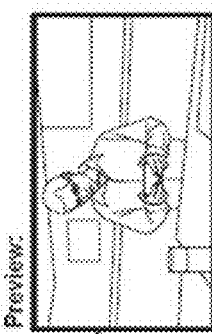
FIG. 5

| | NAME | SOURCE | MULTICAST IP:PORT | TS ID | IMAGE URL |
|---|---|---|---|---|---|
| ☒ | AEEast | 10.252.251.74 | 232.39.254.235:39235 | 1 | http://fl.ula.lab.xcal.tv:6081/liveimage/AEEast |
| ☒ | CNBC | 10.252.251.74 | 232.39.254.226:39226 | 1 | http://fl.ula.lab.xcal.tv:6081/liveimage/CNBC |
| ☒ | CNNEast | 10.252.251.74 | 232.39.254.241:39241 | 1 | http://fl.ula.lab.xcal.tv:6081/liveimage/CNNEast |
| ☒ | ComedyEast | 10.252.251.74 | 232.39.254.228:39228 | 1 | http://fl.ula.lab.xcal.tv:6081/liveimage/ComedyEast |
| ☒ | DiscoveryEast | 10.252.251.74 | 232.39.254.230:39230 | 1 | http://fl.ula.lab.xcal.tv:6081/liveimage/DiscoveryEast |
| ☒ | DisneyEast | 10.252.251.74 | 232.39.254.244:39244 | 1 | http://fl.ula.lab.xcal.tv:6081/liveimage/DisneyEast |
| ☒ | EEast | 10.252.251.74 | 232.39.254.240:39240 | 1 | http://fl.ula.lab.xcal.tv:6081/liveimage/EEast |
| ☒ | ESPN | 10.252.251.74 | 232.39.254.218:39218 | 1 | http://fl.ula.lab.xcal.tv:6081/liveimage/ESPN |
| ☒ | FBN | 10.252.251.74 | 232.39.254.221:39221 | 1 | http://fl.ula.lab.xcal.tv:6081/liveimage/FBN |
| ☒ | FoxNews | 10.252.251.74 | 232.39.254.239:39239 | 1 | http://fl.ula.lab.xcal.tv:6081/liveimage/FoxNews |
| ☒ | HBOEast | 10.252.251.74 | 232.39.254.242:39242 | 1 | http://fl.ula.lab.xcal.tv:6081/liveimage/HBOEast |
| ☒ | HGTVEast | 10.252.251.74 | 232.39.254.227:39227 | 1 | http://fl.ula.lab.xcal.tv:6081/liveimage/HGTVEast |

FIG. 6

IMAGE SAMPLING FROM MULTICAST STREAMS

CROSS REFERENCE TO RELATED APPLICATIONS

The present application is a continuation of and claims priority to U.S. patent application Ser. No. 13/290,441, filed Nov. 7, 2011, and entitled "IMAGE SAMPLING FROM MULTICAST STREAMS," which claims priority to U.S. Provisional Application No. 61/442,628, filed Feb. 14, 2011, and entitled "Image Sampling From Multicast Streams," and incorporates the contents of these applications herein by reference in their entirety.

BACKGROUND

With the increasing proliferation of content, such as video content, being offered to users, there is an increased demand for easy ways to let users view, search for and/or access the content, or allow users to communicate information related to content.

SUMMARY

Some aspects of features described herein relate to helping users locate and use the content that is available to them. In one aspect, a server can be used to obtain periodic image samples for various video services (e.g., television channels, movies, etc.), and offer those periodic image samples to client devices and/or applications that, in turn, can use those samples to help their users locate or use desired content.

In some embodiments, one or more servers may simultaneously access or subscribe to a plurality of content sources, such as video multicast stream sources. The servers may periodically capture images from each stream, and store the images in different corresponding storage locations associated with different streams. The storage locations may then be provided or made accessible to requesting clients, who may receive periodically updated still images from a plurality of live video streams.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 5 illustrates another example screenshot for use by users and clients.

FIG. 6 illustrates an example interface with an image capture server.

DETAILED DESCRIPTION

Figure 1:
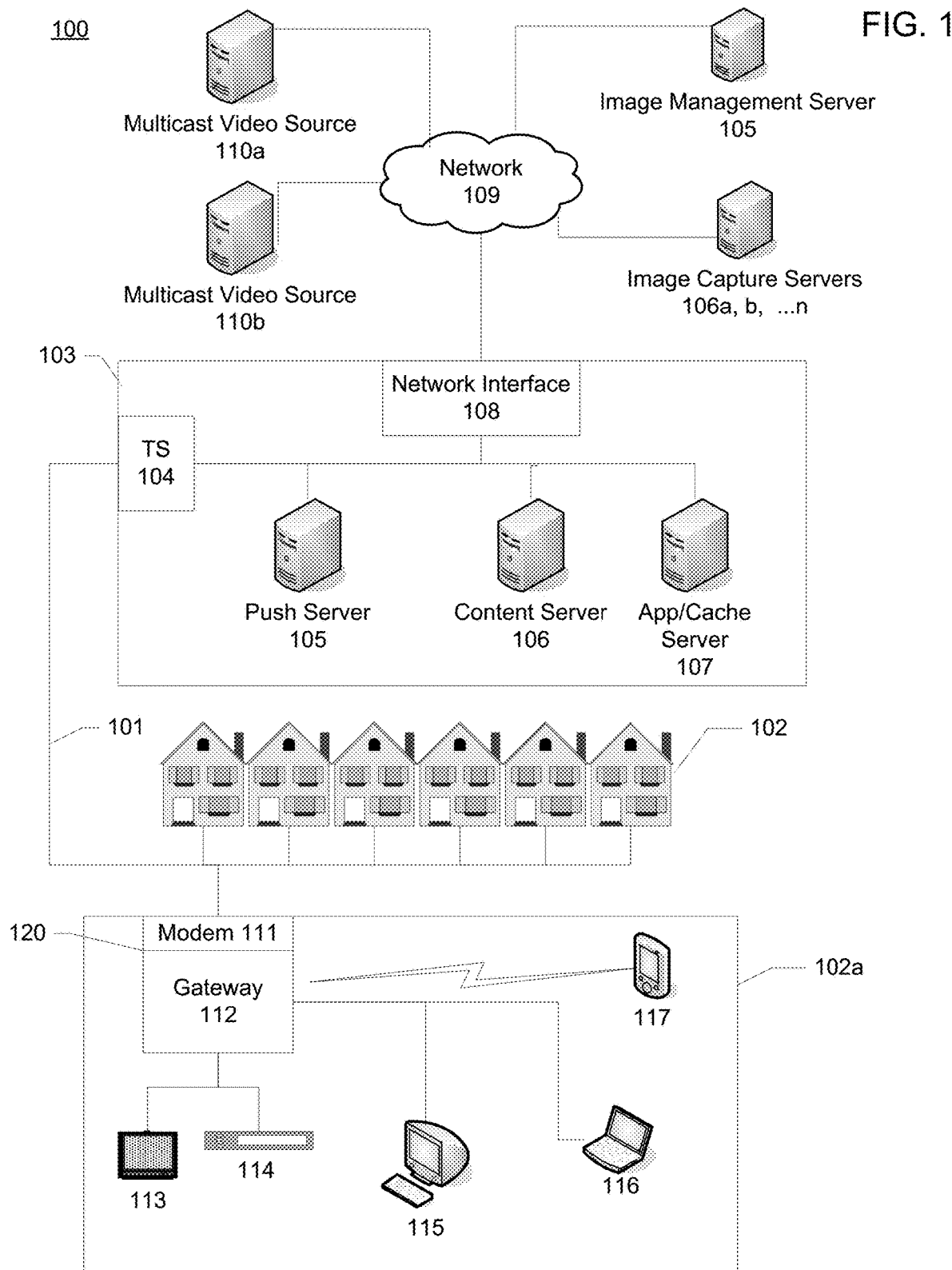
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication lines 101 (e.g., coaxial cables, optical fibers, wireless links, etc.) to connect multiple homes 102 or other user locations to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. Although the term home is used by way of example, locations 102 may be any type of user premises, such as businesses, institutions, etc. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones, or other network devices. For example, the network 109 may communicate with one or more content sources, such as multicast or unicast video sources 110a-b, which can supply video streams for ultimate consumption by the various client devices in the homes 102.

As noted above, the central office 103 may include a variety of servers 105-107 that may be configured to perform various functions. For example, the central office 103 may include a push notification server 105 that can generate push notifications to deliver data and/or commands to the various homes 102 in the network (or more specifically, to the devices in the homes 102 that are configured to detect such notifications). The central office 103 may also include a content server 106 configured to provide content to users in the homes. This content may be, for example, video on demand movies, television programs, songs, text listings, etc. The content server may include software to validate user identities and entitlements, locate and retrieve requested content, encrypt the content, and initiate delivery (e.g., streaming) of the content to the requesting user and/or device.

The system may also include computing devices such as an image capture management server 105 and one or more image capture servers 106a . . . n. As will be described below, the image capture servers 106 may process multiple video streams and periodically extract images from each stream. The image capture management server 105 may coordinate the image capture process and interact with various cache servers 107 to handle client requests for images and related services.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be used to implement a cache server for the image capture system described herein. As will be described further below, the image cache server 107 may receive and process requests from various clients for up-to-date images that have been captured by the system described herein. Other example application servers may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include an interface 120. The interface 120 may comprise a device 111, such as a modem, which may include transmitters and receivers used to communicate on the lines 101 and with the central office 103. The device 110 may be, for example, a coaxial cable modem (for coaxial cable lines 101), a fiber interface node (for fiber optic lines 101), or any other desired device having similar functionality. The device 111 may be connected to, or be a part of, a gateway interface device 112. The gateway interface device 112 may be a computing device that communicates with the device 111 to allow one or more other devices in the home to communicate with the central office 103 and other devices beyond the central office. The gateway 112 may be a set-top box (STB), digital video recorder (DVR), computer server, or any other desired computing device. The gateway 112 may also include (not shown) local network interfaces to provide communication signals to devices in the home, such as televisions 113, additional STBs 114, personal computers 115, laptop computers 116, wireless devices 117 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Any of the devices in the home, such as the gateway 112, STB 114, computer 115, etc., can include an application software client that can make use of the video images captured by the image capture servers.

Figure 2:
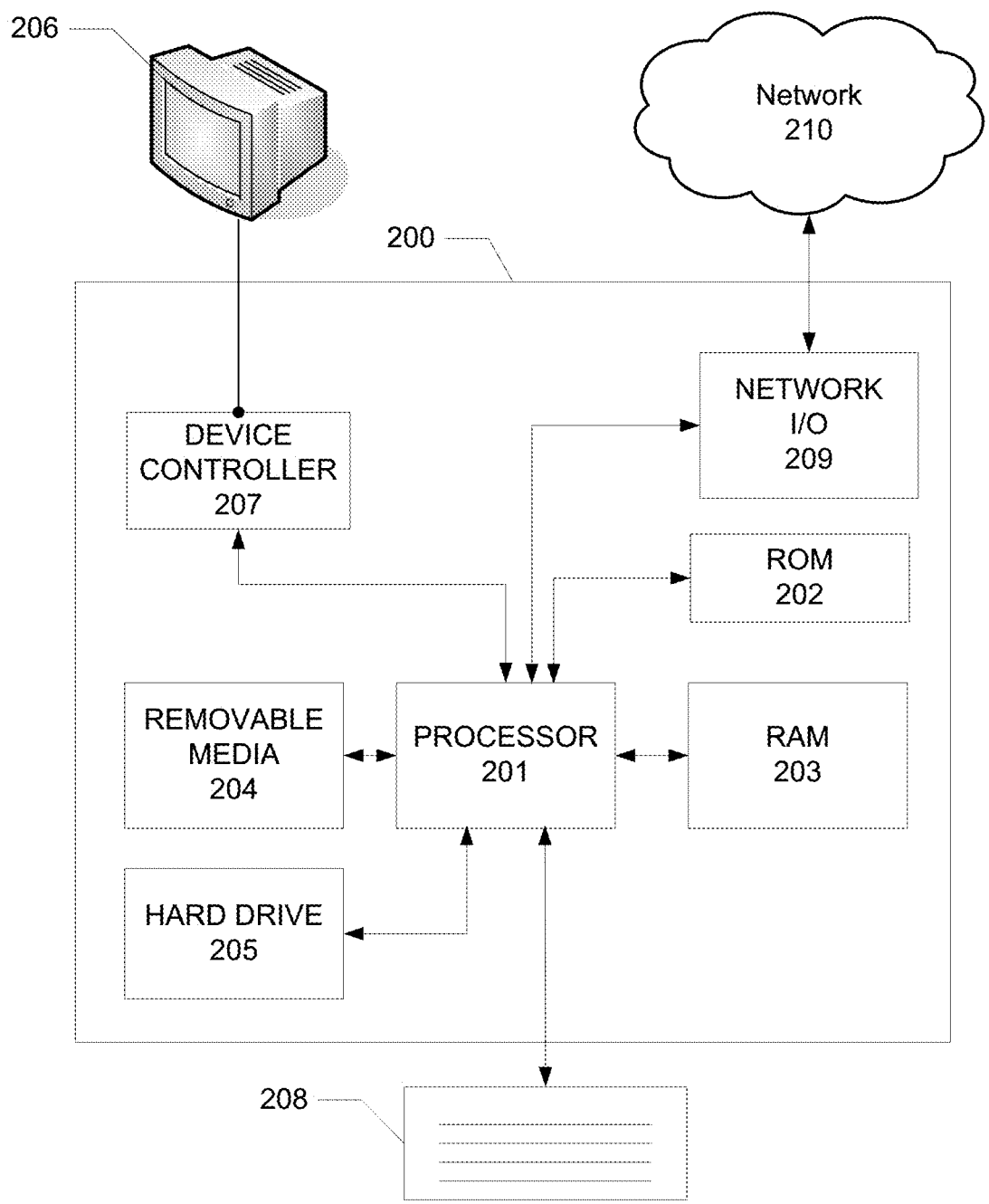
FIG. 2 illustrates an example hardware or software platform on which the various elements described herein can be implemented.

FIG. 2 illustrates general hardware elements that can be used to implement any of the various computing devices and/or software discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the central office 103 or another content storage facility or location. For example, one such user may be a viewer who is watching a television program being transmitted from the central office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

FIG. 3 illustrates an example process that can be executed by software and components described herein, including computing devices such as an image capture management server 105, capture server 106, or cache server 107. The following steps will be described as being performed by particular servers, for the sake of simplicity, but any computing devices can be used. In step 301, the management server 105 may determine whether any new clients have requested to access or register for the image sampling service and obtain security credentials (e.g., password, keys, etc.) that may be used to later request and receive captured images. The clients can be any software and/or hardware device or process that wishes to obtain the images sampled by the image capture servers. For example, one client may be a digital video recorder (DVR) device running an application (e.g., an EPG-type application) that offers users images or other selective data from listed content, such as video programs. Another client may be an Internet server hosting a web page that includes current or real-time images from one or more video services.

The registration itself can be requested in a variety of ways. For example, the clients may be provided with a URL to log in to, or register for, the image capture service. The client may send an HTTP request to the image capture management server 105. In response to a registration request, the management server 105 may authenticate the client in step 302. The authentication can take any desired form. For example, a client's request may include a unique identifier (e.g., an account login, a device address such as a media access control (MAC) address, etc.) and security information (e.g., a digital signature, password, etc.), and the management server 105 may use this information to determine if the particular client is permitted to access the image capture service. To make this determination, the management server 105 may issue a request to an entitlement server (not shown), identifying the user who may be associated with the client, and may receive a response indicating what video services the user (or the user's devices) is allowed to access. For example, some services may require subscription and/or payment to access (e.g., pay services like HBO, Showtime, or video on demand content), and the entitlement server's response can identify what services the user is permitted to receive. The management server 105 may store information identifying the user's access rights (e.g. identifying permitted and prohibited services), and can respond to the client and provide it with an additional key or password or other information that can be used for subsequent communications with the client. In some embodiments, this key or password can have a limited life (e.g., 10 minutes), and the client may need to issue a new login request periodically in order to continue to receive access to the captured images described herein.

In some embodiments, the management server 105 is preconfigured with a listing of all content, such as video and/or data streams, that it needs to support. Alternatively, the server 105 may allow for the dynamic addition/removal of supported streams (or other content). For example, the server 105 may automatically scan through one or more predetermined addresses known to be used for multicasting content, or a video asset management system (e.g., a video on demand server) can affirmatively notify the server 105 when a new stream begins. For such systems, in step 303, the management server may determine whether a new video or data stream is being transmitted and needs to be added to the service. The streams may correspond to linear (e.g., transmitted according to a predetermined schedule) or on demand video services, such as television networks (e.g., ESPN, HBO, etc.) or Internet Protocol streaming services (e.g., webcasts, online videos, etc.) that are transmitting (e.g., broadcasting, multicasting, or otherwise making available) content, and this determination can be done in a variety of ways. For example, a content server 106 at the central office 103 may be responsible for offering the streams to its users, and in so doing, the content server may be configured to send a message to the image capture management server 105, informing the management server 105 of the new stream. The message may identify, for example, details about the stream, such as information identifying the program's name, its service provider, its video resolution, its encoding type and decoding requirements, an MPEG2 transport stream identifier, and any other information needed to locate the stream. A stream may be active so long as it is actively transmitting content, such as streaming live video captured from a camera at a sporting event, or streaming a previously-recorded video in response to a video on demand request.

If a new stream is to be added, then in step 304 the management server 105 may determine what capture parameters should be used for the new stream. The capture parameters may identify, for example, how frequently frames should be sampled from the stream (e.g., once per second), what size those frames should be (e.g., pixel resolution), color quality, and where the frames should be stored (e.g., creating a directory path or file location on the server 105's memory device). In some embodiments, the capture parameters may be constant across all captured streams. In other embodiments, different streams may be subject to different parameters. For example, some programs may have their images captured more or less frequently than others. The images captured may also be manipulated in different ways. For example, an advertisement image or watermark logo may be added to the captured still image. The various parameters may be established by the management server 105, by a content provider, by a requesting client device, or any other desired source.

In step 305, the management server 105 may assign the new stream to a capture server 106a . . . n. The assignment may be based on the capture server's existing load, as well as the parameters determined in step 304, in order to balance the processing load among the capture servers. When a capture server is assigned a stream, the corresponding capture server may begin a new instance of a software process to capture images from that stream (e.g., each stream being captured may be serviced by its own instance of image capturing software). The software instance may then join or subscribe to the video stream. For example, the video stream may be a unicast feed, multicast feed, or source-specific multicast feed, and the software instance may transmit a request to a multicast server to join the feed and begin receiving its video. From there, the capture server 106a . . . n can monitor the video stream, capture images at the rate and type specified in the capture parameters, generate a still image in accordance with those parameters (e.g., having the required pixel dimensions/size), and store the image in the specified path or file location on the server 106's hard drive. Alternatively, the captured images may be transferred to a different storage location, such as the server 105's hard drive, or any other shared memory space.

The joining of a stream and capturing from the stream can be done in any desired manner. For example, the capture server 106a . . . n may join an MPEG2 source-specific multicast stream, and may use a media tool such as a VideoLAN client, MPlayer media player, or out of browser Silverlight application to capture the desired still images from the stream. For the MPlayer media player, an example command line instruction may be as follows:
mplayer -lavdopts skipframe=nonref: skiploopfilter=nonkey:lowres=2-sstep60-
nodouble -nosound -vc $codec -ni -vo jpeg:outdir=output-cnn -frames 1000-vf scale=320:180, framestep=8-reuse-socket -tsprog $3 udp://@232.47.254.0:47000>/dev/null The "-nosound" parameter may cause the player to omit processing of sound data, which can be useful to streamline processing. The "lowres=2" parameter may establish a resolution or image quality level for the capture of the images, while the "scale=320:180" parameter may set the pixel resolution to be 320×180.

The "-vc $codec" parameter may identify the codec being used to encode and decode the stream.

The "jpeg:outdir=output-cnn" parameter identifies the file or path location on the capture server 106 where the captured still images should be stored.

The "-frames 1000", "-framestep=8" and "-sstep60" parameters may define a limit on the number of frames to capture, or how frequently to capture them.

The "-lavdopts skipframe=nonref:skiploopfilter=nonkey" parameter may cause the player to skip frames and relieve demands for CPU performance.

The "-reuse-socket" parameter may be useful if multiple instances of the MPlayer need to connect to the same IP port of a multicast feed if the feed is using a multiple program transport stream (MPTS) format.

The "-tsprg <id>" parameter may help identify the particular program in the transport stream, if the feed is using an MPTS. The "udp://" parameter may identify the multicast source IP address for the stream.

A call to a VideoLAN client can contain similar parameters identifying the output format, lack of audio, output location, etc., such as follows:
cvlc -V image udp://@232.47.254.0:47000-image-out-prefix=PREFIX -image-out-format=png -image-out-ratio=30-image-out-width=320-image-out-height=180-no-video-title-show noaudio Other parameters may also be used to skip frames (ffmpeg-skip-frame or ffmpeg-skip-idct), lower the resolution (ffmpeg-lowres, ffmpeg-fast, scene-ratio), use hardware decoding (ffmpeg-hw), and any other desired operation parameter.

The image capture server can also dynamically resize the images that are initially captured, to provide one or more alternate sizes of the same image that can be made available. For example, after images are captured by the VideoLAN client, the capture server 106 may pass the images to another tool, such as ImageMagick, to generate resized versions.

Referring back to FIG. 3, after the video stream has been assigned to a capture server 106, the management server 105 may proceed to step 306, and add the new stream to a list file identifying the streams that are being actively captured. The list may be a simple text file stored on the management server 105's hard drive, and may list the streams by service provider or source name, source address (e.g., IP address), multicast port ID, transport stream ID, and universal resource locator (URL) identifying where the captured images for a particular stream are available. The list may also identify other parameters for the capture, such as time/date of latest or first capture, capture frequency, image quality (size, resolution, pixel dimensions, compression type, etc.), title of current program being captured, alternate images captured, etc.

As noted above, some embodiments of the management server 105 may be preconfigured to process a predetermined set of video streams, and need not include the option of adding a new stream. Steps 304-306 may also be performed in those embodiments, for example, when the service initializes.

Returning to step 307, the management server 105 may determine if it has received a request for captured images. For example, a client EPG on a user's computer 115 may be configured to incorporate the latest images from program sources in a channel listing, and may send the request for the images. The request itself may be in any desired format. For example, the request can be an HTTP request such as the following:
http://flab.xcal.tv/api/request In some embodiments, the request can be directed to the cache server 107, and the cache server 107 can be configured to serve as a transparent proxy for the management server 105. The cache server 107 can then redirect the request to the management server 105. Such a transparent proxy may allow the management server 105 and/or capture servers 106 to remain hidden from normal public view, as a security precaution. The cache servers 107 may instead be trusted with the actual URLs of the management server 105 and capture servers 106, and can store an address conversion or lookup table mapping the URL requested by the client and the corresponding address/URL for the servers 105/106.

The request can also include parameters identifying the requested information. For example, the request can be a request to obtain a listing of available services, or to retrieve captured images. In some embodiments, the request can specify which streams are of interest for sampling or viewing (e.g., allowing clients to avoid receiving images from streams that are of no interest to the client's user). In some embodiments, the request can ask to filter the still images to avoid receiving images from certain types of programs or service providers. For example, the requesting client can ask that it not be given still images from adult video content, specific programs, or content from certain predefined service providers known to offer content in which the client's user has no interest.

If a request has been received, then in step 308, the management server 105 may authenticate the request. The authentication may be based on the authentication performed when the client originally registered for the service, and may involve a simple lookup to determine whether the client's identifier (e.g., its MAC address) is found in a listing of authorized clients maintained by the server 105 from step 302's authentication. Alternatively, the request may carry with it a value that has been signed by a key provided in the authentication 302, or a password, or any other desired form of authentication that can determine if the requesting client is permitted to receive the requested content. As another alternative, the request can simply identify the requesting user or device (e.g., a subscriber ID, a hardware identifier, an address, etc.), and the management server 105 can use that identification information to determine the preferences and/or entitlements of the user or device. The management server 105 can also provide the identification information to an entitlement server (not shown), requesting confirmation of the user's entitlements/restrictions/preferences.

If the request is authenticated, then the server 105 may proceed to step 309, and collect the relevant information that is responsive to the request. This may include examining the request, or querying the requesting client, for parameters and/or restrictions on the information requested. For example, the requesting client may provide a list of content, such as television programs or video content services (e.g., ESPN, HBO), whose still images or other descriptive data are requested, or whose still images are to be avoided. The requesting client can also specify formatting preferences for the requested images, such as desired sizes, file formats, etc. In some embodiments, the management server 105 and/or capture server 106 can be configured to dynamically resize images for requesting clients, in response to a client's request. Additionally, or alternatively, the capture servers can be configured to capture and store multiple different versions of images from the stream, storing them in different sizes, formats, etc. The server 105 may then gather the information that is responsive to the request, and return it to the requesting client. The response can include data such as a series of records, one for each stream monitored by the system and available to the requesting user, and the following is an example of a record that can be returned to the client:

```
{"name":"18324","source":"10.252.251.74","active":true,
"node":"http://ia.ula.lab.xcal.tv","imageUrl":"http://127.0.0.1:8080/
liveimage/18324","multicastIp":"232.39.254.231","multicastPort":
"39238","tsProgramId":"1","codec":"ffh264","cdnUrl":"ccp-
cmc-smooth-pod01iis01.cds.bdn.lab.xcal.tv/cnn.isml/manifest",
"longName":"CNHNHD","stationId":"8537732268987025117" }
```

The above example is an entry for a single feed being captured by the capture service. The parameters returned can include a "name" parameter (18324) as a handle identifying this particular record; a "source" parameter (10.252.251.74) identifying a multicast source IP for the stream; and an "active" parameter (true) indicating whether this particular stream is actively being captured. The "active" parameter may be used, for example, to indicate whether a recent capture for the stream has been successfully captured. If the stream has experienced an error or is no longer transmitting, or if an error capturing the image has occurred, the "active" value can be set to "false," to indicate that there is no current valid image available for the stream, but that the stream remains among the ones that the system is attempting to capture.

The "node" parameter (http://ia.ula.lab.xcal.tv) can identify the URL of the specific capture server 106 that has been assigned to capture this stream. In embodiments in which the cache server 107 acts as the point of contact for clients, a well-behaved client will have no need for the direct "node" URL, as the client will be interacting with the cache 107, and not the actual server 106.

The "imageURL" parameter (http://127.0.0.0.1:8080/liveimage/18324) provides the URL that the requesting client should use to retrieve the current image for this stream. This URL can be registered to point to the cache 107, and the cache 107 can contain its own internal lookup table to redirect the request to an address of the management server 105 where the current image can be found.

The "multicastIP" parameter (232.39.254.231) and tsProgramID (1) parameters can identify the multicast group IP address and transport stream identifier for the stream being captured.

The "codec" parameter (ffh264) may identify the codec (coding/decoding) being used for the stream, and the "cdnURL" (ccp-cmc-smooth-pod01 . . . /manifest) may provide the URL for the video stream being captured. This may be used, for example, if the client wishes to directly view the stream.

The "longName" parameter (CNHNHD) may be an alphanumeric or textual name of the stream represented by the record.

The "stationid" parameter (85377322 . . . ) may be an identifier used to associate the current record with an overall metadata EPG database. For example, if the current program being streamed on the CNHNHD network is a nightly news program, then the stationid parameter may correspond to an identifier used to identify that program in an EPG database, which can contain additional information about the program (e.g., its nightly topics, text description, duration, other air times, etc.). This value may be useful, for example, if a client wishes to request additional information about the given program, in which case the client can use this identifier to submit a request to the EPG database.

In addition to retrieving and returning entries identifying the streams being captured, the manager 105 can respond to other types of requests as well. For example, a client may request to receive a slate of the most recent image (or predetermined number of images) for a plurality of services identified in the request. In response, the cache 107 (via the manager 105) may provide the URLs for the images in the sample entry above, and the client may issue URL requests for the particular images of interest to the client.

In step 310, the responsive information may be transmitted to the client for use in the client's own application. At that point, the client may determine which of the listed records is of interest, and can issue new requests to the corresponding URLs.

In step 308, if the client's request fails authentication, then the server 107 may respond in step 311 by reporting the denial to the client (or outright ignoring the request).

Proceeding to step 312 (FIG. 3b), the manager server 105 can check to determine if there has been a request to change any of the capturing parameters. As noted above in step 304, each stream can be captured according to its own set of parameters (e.g., its own capture rate, image quality, etc.) that can be established when capturing begins. After capturing has begun, however, the manager server 105 and/or video source (e.g., source 110a) may be asked to change those parameters. For example, the manager server 105 may receive indication from a capture server 106 that the server 106 has exceeded a maximum processing threshold, or is exhausting processing resources, and the server 105 may determine to reduce the workload by adjusting the capture parameters or reallocating the capturing to a different capture server 106. As another example, a new client may register with the system, and may make a request to receive a different type of still image (e.g., different resolution, different capture frequency, etc.), and the manager server 105 may determine to alter the capture parameters to accommodate the new client's request.

In step 313, the manager 105 may send an instruction to one or more of the capture servers 106a . . . n, instructing the servers to change their capturing parameters. The capture servers 106a . . . n may accept the new parameters and restart the various capture instances for the various streams or feeds that they are capturing.

In step 314, the manager 105 may determine if a stream has ended. For example, if a program being streamed terminates, or is no longer being viewed by viewers, the stream may be torn down by the streaming server or video source 110, and accordingly, the capturing for those streams can be torn down as well. The streaming servers may be configured to transmit a message to the manager 105, informing if of the termination of the stream. Alternatively, the manager 105 may periodically (e.g., once per minute) inspect all of the streams in the active stream list, and check to verify that those streams remain active (e.g., by looking for recent images, or by sending a heartbeat query to the multicast server handling the stream).

If a stream has ended or is no longer desired or available, then the manager 105 may proceed to step 315, and instruct the corresponding capture server to terminate its capturing of the stream, and to release any resources that were reserved and/or occupied by the capturing process for that stream. In step 316, the manager 105 may update its active stream list to remove the entry for the closed stream, or to otherwise indicate that the stream is no longer being captured.

In step 317, the manager 105 (or other computing devices such as the various capturing servers 106) may run a cleaner routine. The cleaner routine may inspect the file directories in which each capturer instance (e.g., each instance of the capture software that is running on a server) is storing images, and delete outdated or unneeded images. For example, the cleaner may be configured to maintain a predetermined number (e.g., 5, 10, 100, etc.) of previous images for each stream, and can delete the older images that are no longer needed. Alternatively, each captured image may be associated with a time to live value, and the cleaner routine may involve determining whether an image's time to live has expired. For example, an image may have a time of 10 seconds to live in the capture directory, and 10 seconds after the image is captured, the image will be deleted from the directory (or the next time the cleaner runs after 10 seconds have passed). In some alternative embodiments, each capture instance may maintain a predetermined number of images (e.g., 5), each having a time to live, and the capture instance can capture a new image only if one of the existing images has exceeded its time to live.

In step 318, the manager 105 may monitor system data and requests, such as by running a watchdog routine. The watchdog routine may monitor the various active streams that are identified in the active stream list, and verify that new files are being written to the directory according to the requirements set in the list. For example, if the capture server 106a is supposed to be capturing one still image per second for a particular stream, the watchdog routine may inspect the directory over the course of several seconds to confirm that new images are indeed being written. This can include, if desired, a comparison with prior images to confirm that the image content is actually changing as well. Additionally, the watchdog may inspect the image files themselves, to confirm that the files are valid image files (e.g., such as by using the Unix file command) and are not corrupted in some fashion. If the watchdog identifies a directory in which image files are no longer being written, or the images are not being updated, the manager server 105 can transmit an inquiry to the corresponding capture server 106 to request its current status for the capture instance that is responsible for capturing the given stream, and to take corrective action (e.g., restarting the instance, tearing it down due to a closed stream, etc.).

The process can then return to step 301, and repeat indefinitely (or until the capture service is paused, terminated, or no longer desired by a client).

Figure 3A:
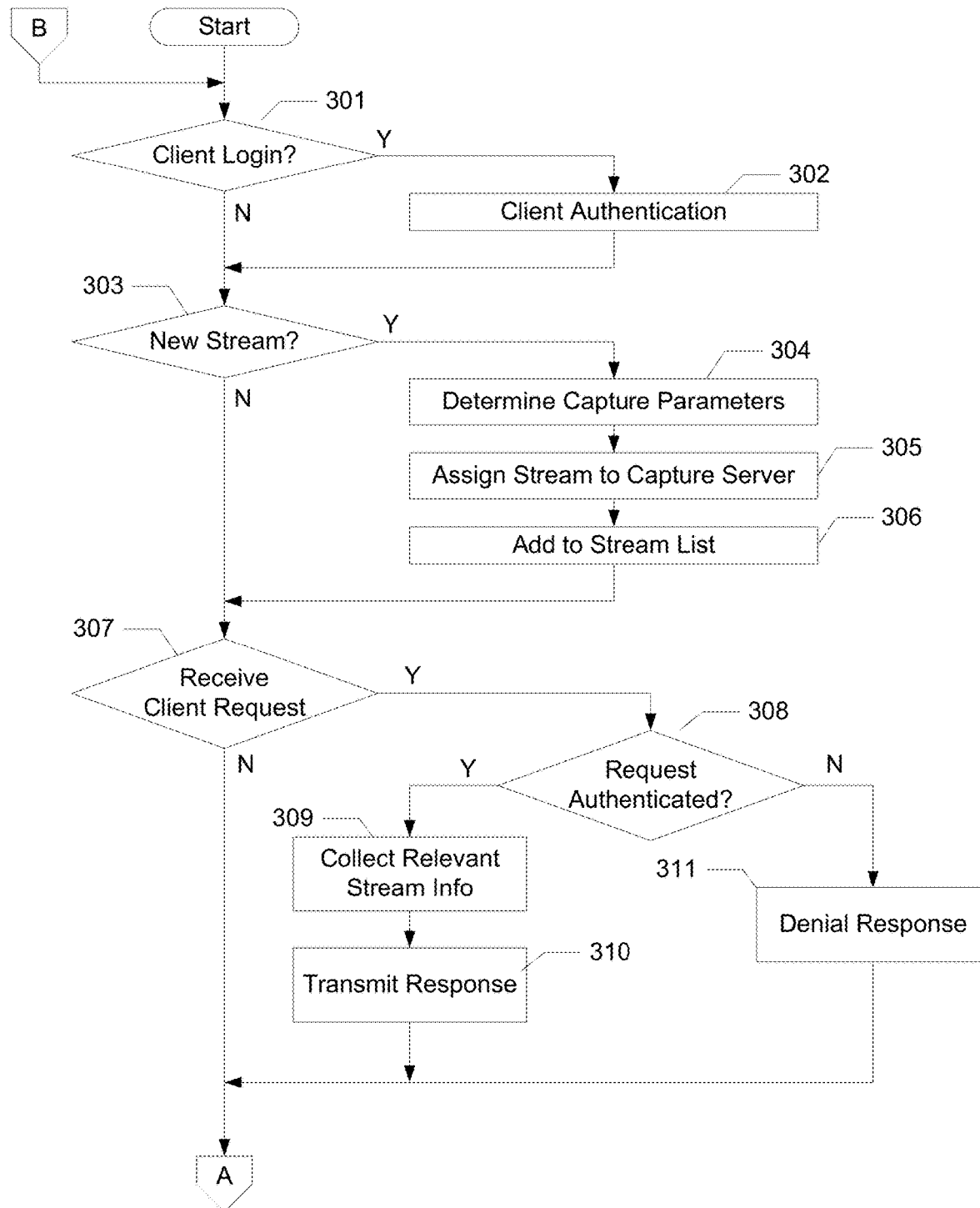
FIGS. 3A & B illustrate an example process for managing one or more image capture servers.
Figure 3B:
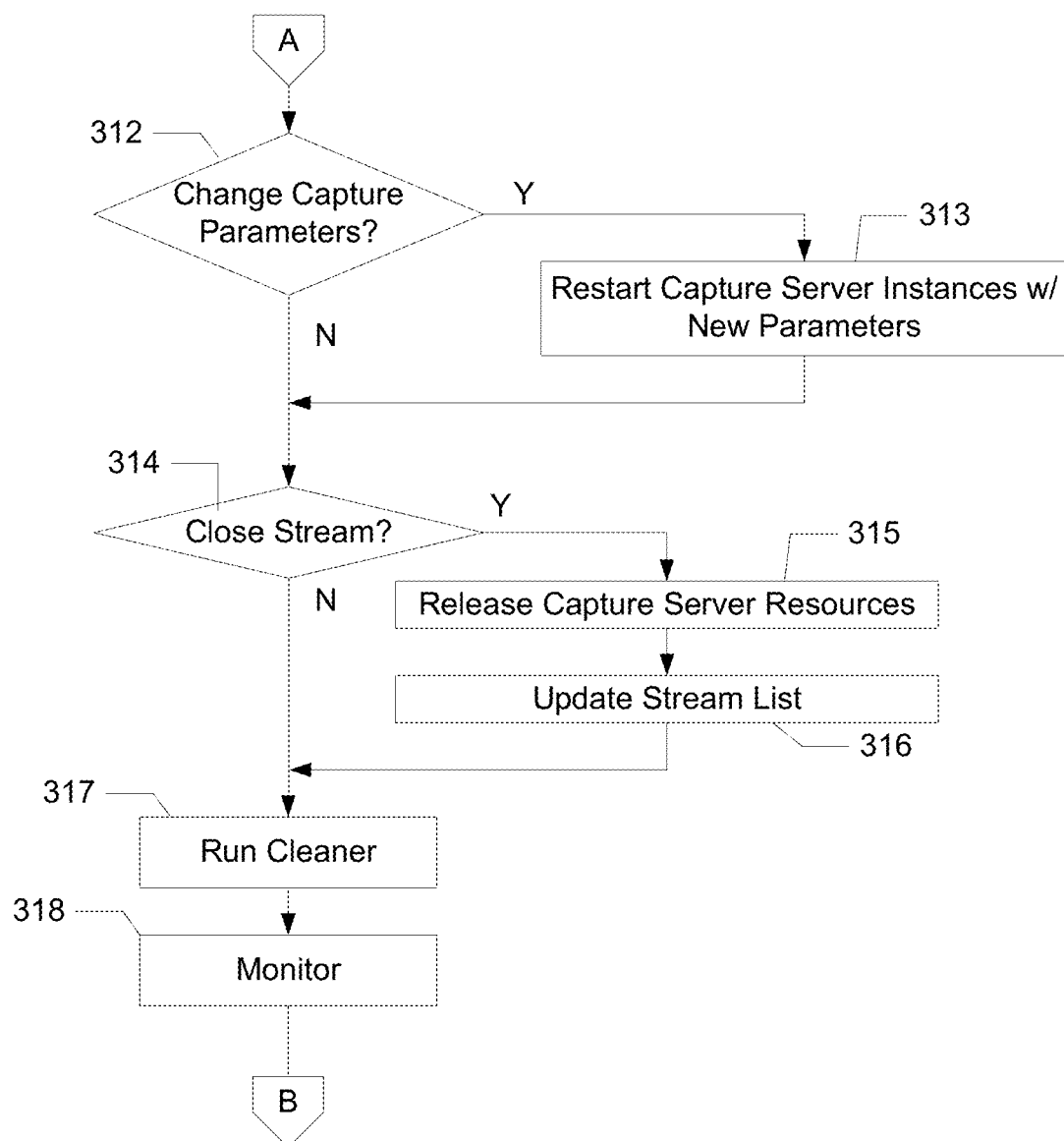
Figure 4A:
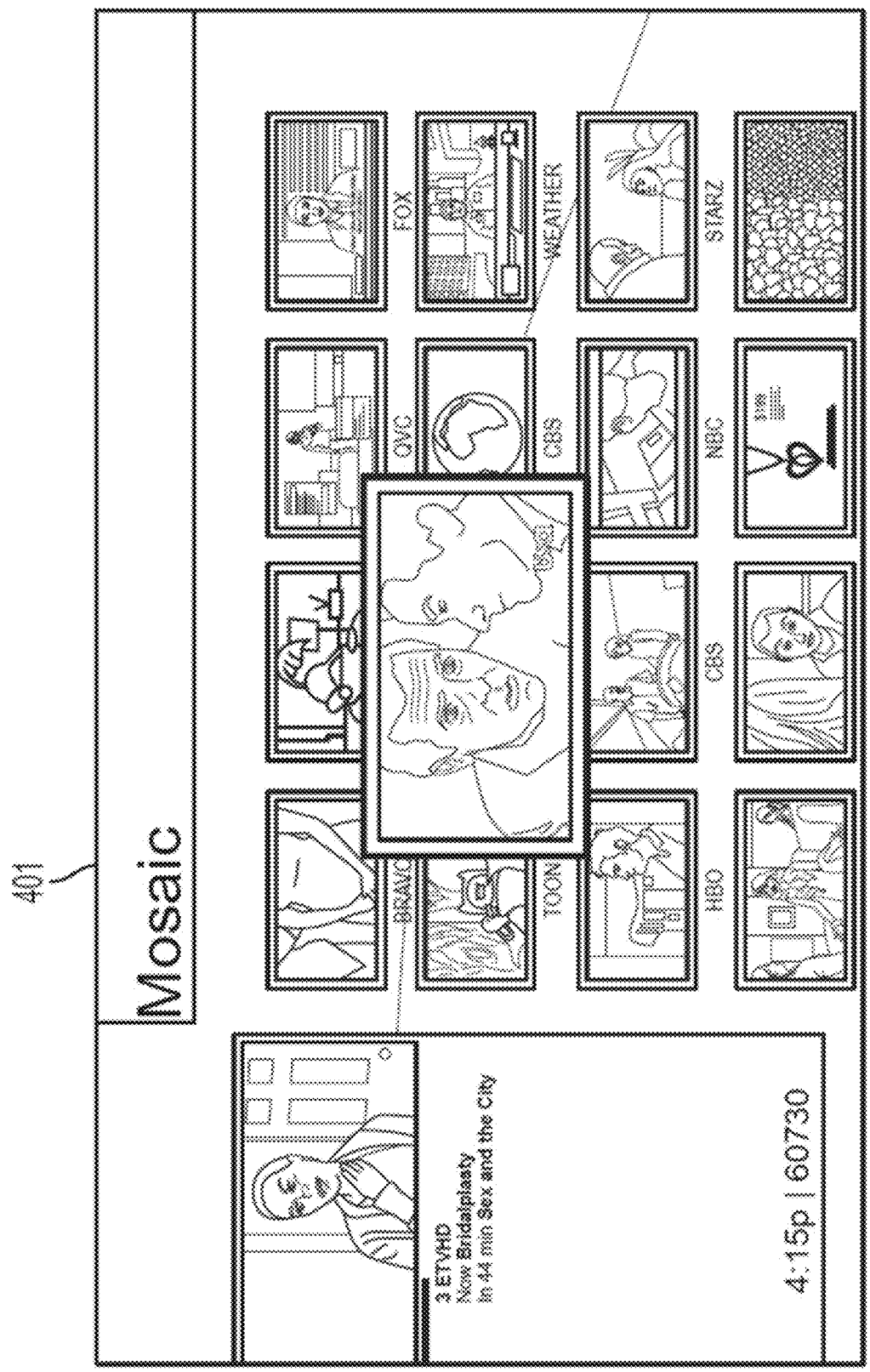
FIGS. 4A & B illustrate example screenshots for use by users and clients.

As a result of the FIGS. 3A & B process or similar processes, clients may be able to obtain current, real-time, image captures for various video streams. One use of the disclosed methods may be applicable to guides, such as electronic program guides (EPGs). Traditionally, EPGs have offered users a textual listing, typically in a grid format, of television shows arranged by channel and time. While the text grid EPG remains a mainstay for some viewers, there is an increasing need for simpler and more appealing ways to search for and access content. FIGS. 4A & B illustrate several examples of the types of features that can be implemented by using the capture service, which can, for example, offer users a more intuitive way to find and view content. In FIG. 4A, an onscreen mosaic 401 can be displayed on a consumption device (e.g., a DVR's associated display, a computer, a smartphone display, etc.). To support this, for example, the consumption device can simply register (as in step 301), and then transmit periodic requests to the manager 105, requesting the latest images that have been captured for each service.

The client device may display the images (or other data descriptive of the content) in the mosaic 401, along with source identification information (e.g., "HBO," "CBS", etc.), and allow the user to peruse the mosaic to select a program. While the user is viewing the mosaic 401, the client can repeatedly request updated images from the capture manager 105, and update the images appearing in the mosaic 401. In this manner, the user viewing the mosaic 401 can see a dynamically updating set of tiles reflecting the current happenings on that piece of content or service. This can allow the user to identify a program (or portion) that may be of the most interest, and choose it for viewing and/or recording. The user can navigate through the mosaic 401 by moving a cursor to highlight different tiles, and the highlighted tile may be enlarged with respect to other tiles. When the user chooses a tile for viewing, the client can then send a message to the server supporting that service, and request to receive the content, such as join the multicast group for that service.

Figure 4B:
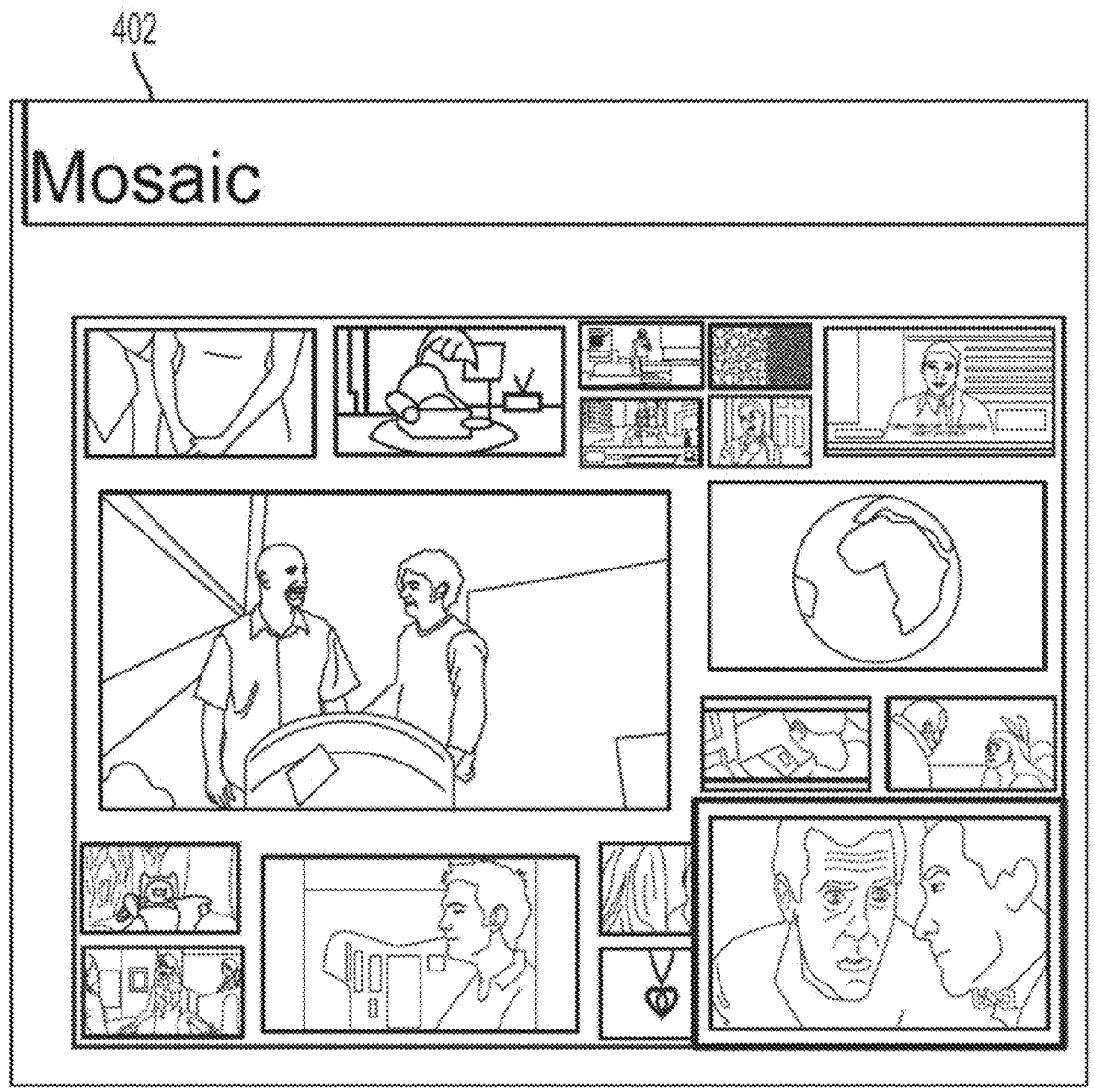

FIG. 4B illustrates an alternative heat map mosaic 402. In this alternative, the tiles for the different programs may be sized differently, according to how popular or highly rated the program is. For example, a more popular program may be shown in a larger tile, with more resolution, than other less popular programs. The popularity of a program can be determined in any desired manner. For example, if the programs are all multicast feeds, then the client (or the manager 105) may request information from various multicast servers to identify the feeds that have the most receiving users. To assemble the heat map, the client may request differently-sized versions of the different services, or the manager 105 can provide the different sizes instead (if the manager 105 is handling the popularity determination). This example heat map uses size to differentiate the more popular programs from the less popular ones, but other approaches may be used as well. For example, more popular programs may be given a brighter appearance or lighter colors. Another alternative would be to use positioning to indicate the most popular program. For example, the most popular program may be positioned in the center of the display, with less popular programs appearing towards the outer periphery. As a further example, different heat maps can be generated for different categories of programs. For example, different heat maps can be generated for dramas and news programs. FIGS. 4A & 4B illustrate example display interfaces, but any other desired display of the captured images may be used.

In some embodiments, a user may select one of the images to filter the view to depict programs that are similar to the selected one, thereby allowing for a recommendation based on similarity. The similarity can be based on any desired measure, such as genre, actors, series (episodic content, movie sequels, etc.), etc. The recommended content can be differentiated from the other content in many ways, such as the heat map examples discussed above. In other examples, the less popular programs may be removed altogether from the display, or their images may no longer be updated (e.g., resulting in only the recommended programs having the updated images). The selection may be made, for example, by navigating a cursor or mouse pointer and clicking on an image. An intermediate selection may be made as well by hovering a pointer over an image.

In some embodiments, a user's selection of a program may be transmitted to the management server 105, which can then aggregate the selection to determine which programs are the most popular. A user's selection of a particular program can also be forwarded to other individuals, such as those who have previously identified themselves to be friends with the selecting user. The selection and/or associated images can also be passed along to social media servers for further user and/or distribution.

FIG. 5 illustrates another example implementation of the disclosure, involving a live channel preview for an EPG 501. In the EPG 501, the user may be permitted to move a cursor or highlight through a grid of cells that identify program titles, and as the user highlights each cell, the client EPG 501 may repeatedly request updated still images for the highlighted program to give the user a live preview of what is being shown on the channel. So, if the user highlights the "Dear Food Network" program in the grid, the EPG can dynamically request and display a preview window 502 for that program, where the preview window 502 is updated once every five seconds to show the latest image from that show. This preview may be useful, for example, if the user does not wish to tune to the new show when it is during a commercial break. Concurrently, the user may also be provided with a currently-tuned window 503, showing the live images from the show that the user was previously watching before entering the EPG.

Another client preview implementation may involve channel changes. When the viewer requests to change the channel or switch to viewing a different stream, it can often take a moment for the user device's (e.g., STB's) decoder to locate, tune and decode the stream carrying the new program or service. In some embodiments, when a channel change request is received, the user device may issue a request to retrieve the most recent image for the new channel, and can display that last image while the user device obtains the live feed for that new channel. Alternatively, the user device can request a predetermined number of the captured images (e.g., the last 5 images), and can present those in a timed sequence prior to displaying the current stream. In that manner, the user can be given a preview and advanced context for what is happening in the program, and perceived "down time" can be minimized. In some embodiments, when a user tunes to a particular channel or service, the client device can automatically request and retrieve captured images for one or more neighboring channels or services (e.g., the next three channels or services that would be displayed should the user press a channel up or channel down key on a remote control three times). These captured images may be stored for use should the user press the channel up/down key, providing the user with immediate feedback on the channel change.

Another client implementation can involve a user who wishes to view a different portion of the program they are currently watching. The user can be presented with a slider bar representing the timeline of the current program, and can be given the option of dragging a pointer along the timeline to select a position to select a starting point for playing back the program content. As the user drags the pointer along the timeline, the client device can retrieve and display the still image nearest the pointer's position along the timeline. For example, the client device can retrieve and cache still images for content that the user is viewing (and also for content the user is not viewing), and store those still images along with a time identifier indicating the time within the program represented by the still image. As the user moves the pointer to make a selection, the client device can determine the time of the pointer relative to the start of the program, find a still image that is nearest to that time, and display that image to assist the user in selecting a starting point.

In some embodiments, the user may be given the option to rewind and/or fast forward through content appearing in either of the windows 502/503. For example, the user can move a cursor through the grid guide to highlight a particular program, and a preview of the program may appear in window 502. The user may then enter a rewind or fast-forward command, and the client device can map the command to the program highlighted by the cursor, and can retrieve earlier or later images from the captured images and present them to the user in window 502, thereby allowing the user to fast forward or rewind through a program that is being previewed in the guide.

Figure 7:
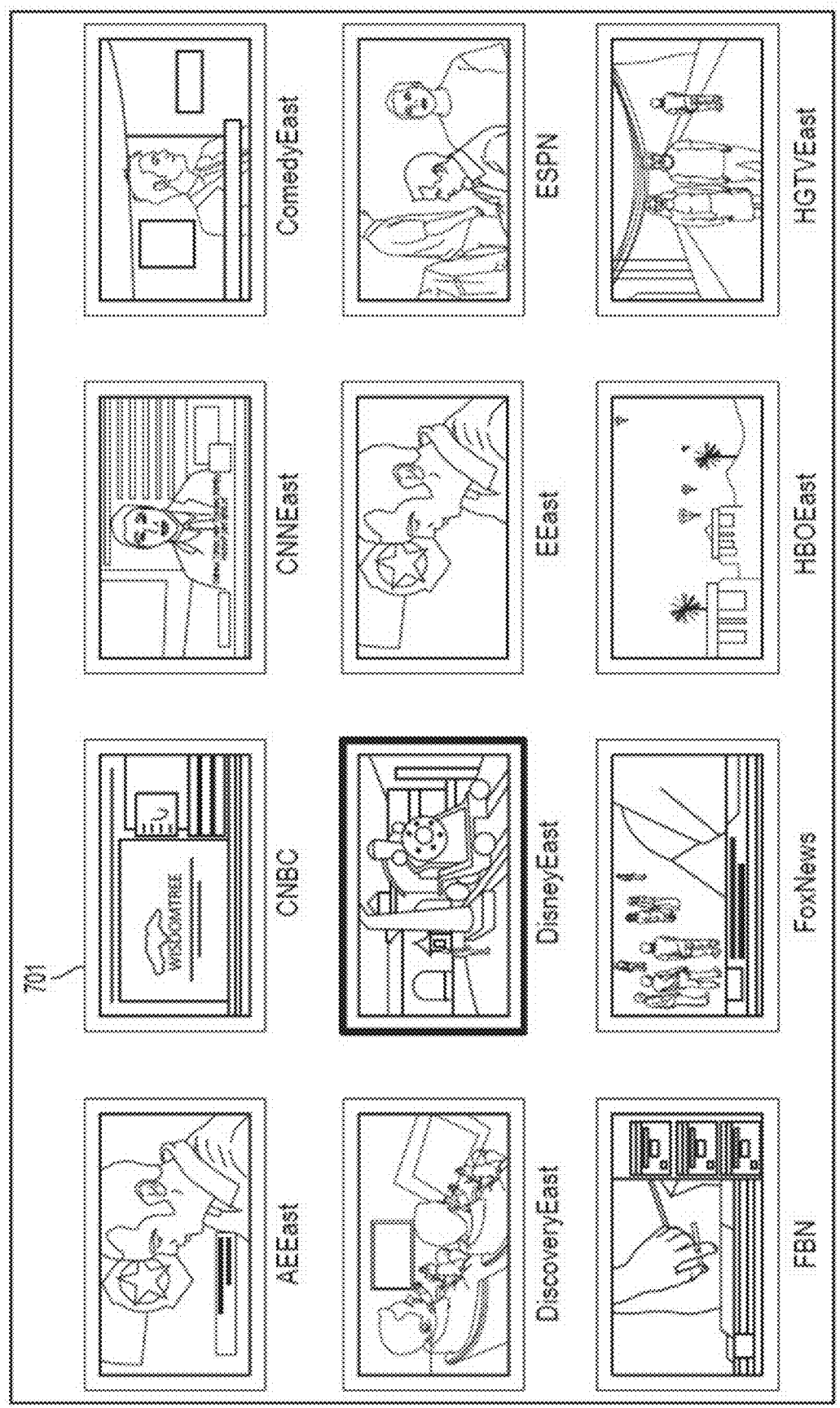
FIG. 7 illustrates an example mosaic of images that can be arranged and/or displayed using the management interface shown in FIG. 6.

FIGS. 6 and 7 illustrate screens or interfaces for another implementation of the disclosure, which can be made at the manager server 105, for example, to assist in managing which stream captures will be made available to requesting clients. In the FIG. 6 implementation, the user (which can be an administrator of the management server 105) may request a listing of the current streams being captured by the capture servers 106a . . . n, and view information for each from the manager 105's active stream list. The displayed information can include the textual name of the service, the IP address of the source's server providing the video stream, address and port information for the particular stream, transport stream identifiers for streams that may be carried in a multiple program transport stream, and a URL for the latest image captured from that stream. Other information about the captures (e.g., the number and types of versions captured, the capture rate or frequency, the image file sizes, etc.) may be displayed as well, if desired.

Along with each entry, the FIG. 6 display can include an option to select or deselect each entry. Selected streams may have their captured images made available to clients, while unselected streams might not have their captured images available, and the images being made available can be viewed on another mosaic 701. With the FIGS. 6&7 implementation, a system administrator at the manager 105 can inspect the images being made available, and identify problems such as dead streams. Also, the administrator can use the interface to define one or more mosaic profiles, picking and choosing different services to be included in each profile. So, for example, the administrator can define a "football" profile, and select the services that are streaming live football games. A client can request that particular profile, and receive captured still images for ongoing football games.

In some embodiments, the management server 105 may be configured to prevent end clients from identifying which capture server 106 is capturing particular streams. To obscure that assignment, the management server 105 may be implemented as a web server with proxying through the cache server 107, such that client requests are directed to the client 107, which in turn communicates with the management server 105.

As noted above, the management server 105 may be a standalone computing device, or it can be implemented as a process on the same device as one of the capture servers 106. When implemented as a standalone, it can serve as an aggregation server, collecting information from the various capture servers regarding what is being captured. To collect this information, the server 105 and capture servers 106 may use RESTful API's to facilitate the exchange of information being captured. The server 105 can also serve as a proxy for incoming requests, and distribute the requests on to the various capture servers 106 when, for example, static images are needed.

In some embodiments, the management server 105 and capture server 106 may be identical hardware, both configured to perform either role, and the selection of one or the other role for a particular piece of hardware can be made based on any desired factor, such as demand, estimated need, etc.

In some embodiments, the features above may be implemented using tools such as the Linux operating system, Tomcat and Varnish tools, and image tools such as MPlayer, VLC, Silverlight and/or ImageMagick to perform the capturing and resizing. Nagios tools may be used to help monitor the performance of the various system components.

Applicants have noted that some optimization parameters may be used in Linux. The Linux soft nofiles parameter may be increased (e.g., set to 16384 files) to increase the number of soft files that a user is permitted to have open at one time, while the Linux hard nofiles parameter may also be similarly increased to allow more open hard files. The queue length (e.g., netunix.max_dgram_qlen=4096) may be increased to allow for a larger packet queue, and a queue backlog timer (e.g., net.core.netdev_max_backlog=40000) may be increased to allow for more time to process queues.

Various memory values may be increased as well, to allocate more space for handling the processes described herein. The following are example memory settings that can be used in a Linux implementation:
net.ipv4.udp_wmem_min=65536
net.ipv4.udp_rmem_min=65536
net.ipv4.udp_mem=33554432 33554432 33554432
net.core.rmem_default=33554432
net.core.wmem default=33554432
net.core.rmem_max=33554432
net.core.wmem_max=4096

Ethernet flow control can also be deactivated, so that the manager 105 can simply drop packets when it gets too far behind in its packet handling, without asking the capture servers 106 to adjust their capture and/or reporting rate. Also, the various security measures (e.g., use of keys, duration of keys, use of the cache server 107 to proxy access to the management server 105 or capture servers 106) can be deactivated as desired.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

We claim:

1. A method comprising:
    receiving, by a computing device and from a server, a plurality of images that are captured from a plurality of content assets comprising a first content asset and a second content asset;
    causing output of the plurality of captured images;
    determining to change a first capture frequency, associated with the first content asset, to a new capture frequency, wherein a second capture frequency, associated with the second content asset and different from the new capture frequency, remains the same based on the change to the new capture frequency;
    receiving, by the computing device and from the server, a first updated captured image corresponding to the first content asset and captured at the new capture frequency;
    receiving, by the computing device and from the server, a second updated captured image corresponding to the second content asset and captured at the second capture frequency; and
    causing output of the first updated captured image and the second updated captured image to replace a first captured image of the plurality of captured images and a second captured image of the plurality of captured images.

2. The method of claim 1, further comprising:
    determining a type of the first content asset; and
    sending, to the server, a request for a recently-captured image corresponding to the first content asset, wherein the request for a recently-captured image indicates a requested image size corresponding to the type of the first content asset.

3. The method of claim 2, wherein the type of the first content asset comprises a genre of the first content asset.

4. The method of claim 1, further comprising:
    receiving a user selection of the first updated captured image; and
    based on the user selection, sending a message to join a multicast group corresponding to the first content asset.

5. The method of claim 1, wherein causing output of the first updated captured image and the second updated captured image comprises causing concurrent output of the first updated captured image and the second updated captured image.

6. The method of claim 1, further comprising:
    sending, by the computing device and to the server, an image request indicating an identification of the computing device; and
    receiving, by the computing device and from the server, a second plurality of images captured based on the identification of the computing device, wherein the second plurality of captured images corresponds to the plurality of content assets.

7. The method of claim 1, further comprising:
    causing output of a listing of the plurality of content assets;
    receiving a user input to highlight a content asset of the listing of the plurality of content assets;
    based on the user input, altering a capture frequency associated with the highlighted content asset; and
    sending a request for recently-captured images corresponding to the highlighted content asset and captured at the altered capture frequency.

8. The method of claim 1, further comprising:
    determining, based on a plurality of different genres of the plurality of content assets, a plurality of capture frequencies that are different for different content assets of the plurality of content assets.

9. The method of claim 1, further comprising:
    receiving a first user input to highlight the first updated captured image corresponding to the first content asset;
    receiving a second user input to adjust at least one of a speed or a sequence of output of images, of the plurality of captured images, associated with the first content asset; and
    causing, based on the second user input, adjustment of at least one of the speed or the sequence of output of the images associated with the first content asset.

10. The method of claim 1, further comprising:
receiving a first user input to highlight the first updated captured image corresponding to the first content asset;
receiving a second user input to rewind images associated with the first content asset;
sending, to the server and based on the first user input and the second user input, a request for one or more images corresponding to the first content asset and captured previous to the first updated captured image; and
causing, based on the second user input, a reverse time-sequenced output of each of the one or more previously captured images.

11. The method of claim 1, wherein causing output of the plurality of captured images comprises causing output of the plurality of captured images at a first rate, and
wherein the method further comprises:
receiving a first user input to highlight the first updated captured image corresponding to the first content asset;
receiving a second user input to fast-forward images associated with the first content asset;
sending, to the server and based on the first user input and the second user input, a request for one or more images corresponding to the first content asset and captured subsequent to the first updated captured image; and
causing, during the second user input, output of each of the one or more subsequently captured images at a second rate that is faster than the first rate.

12. The method of claim 1, further comprising:
determining to change the second capture frequency, associated with the second content asset, to a different capture frequency, wherein the new capture frequency remains associated with the first content asset based on the change to the different capture frequency, and wherein the different capture frequency is different from the new capture frequency.

13. An apparatus comprising:
one or more processors; and
memory storing instructions that, when executed by the one or more processors, cause the apparatus to:
receive, from a server, a plurality of images that are captured from a plurality of content assets comprising a first content asset and a second content asset;
cause output of the plurality of captured images;
send, to the server, a request to change a first capture frequency, associated with the first content asset, to a new capture frequency, wherein a second capture frequency, associated with the second content asset and different from the new capture frequency, remains the same based on the change to the new capture frequency;
receive, from the server, a first updated captured image corresponding to the first content asset and captured at the new capture frequency;
receive, from the server, a second updated captured image corresponding to the second content asset and captured at the second capture frequency; and
cause output of the first updated captured image and the second updated captured image to replace a first captured image of the plurality of captured images and a second captured image of the plurality of captured images.

14. The apparatus of claim 13, wherein the instructions, when executed by the one or more processors, further cause the apparatus to:
determine a type of the first content asset; and
send, to the server, a request for a recently-captured image corresponding to the first content asset, wherein the request for the recently-captured image indicates a requested image size corresponding to the type of the first content asset.

15. The apparatus of claim 13, wherein the instructions, when executed by the one or more processors, further cause the apparatus to:
receive a user input to highlight the first updated captured image; and
based on the user input, cause the first updated captured image to be enlarged.

16. The apparatus of claim 13, wherein the instructions, when executed by the one or more processors, further cause the apparatus to:
receive a user selection of the first updated captured image; and
based on the user selection, send a message to join a multicast group corresponding to the first content asset.

17. The apparatus of claim 13, wherein the first content asset is associated with a first video stream, and the second content asset is associated with a second video stream different from the first video stream, and
wherein, during a time period, images are captured from the first video stream and from the second video stream at different capture frequencies indicated in a request by the apparatus to receive the first video stream and the second video stream.

18. The apparatus of claim 13, wherein the instructions, when executed by the one or more processors, further cause output of the plurality of captured images by concurrently outputting to a content asset listing:
captured images of the first content asset captured at the new capture frequency; and
captured images of the second content asset captured at the second capture frequency.

19. The apparatus of claim 13, wherein the plurality of content assets are associated with plurality of different video streams, and
wherein each of the different video streams is associated with a stream-specific capture frequency.

20. A method comprising:
causing, by a computing device, output of a content asset listing comprising a plurality of captured images associated with a plurality of content assets;
determining to change a first capture frequency, associated with a first content asset of the plurality of content assets, to a new capture frequency, wherein a second capture frequency, associated with a second content asset of the plurality of content assets and different from the new capture frequency, remains the same after the change to the new capture frequency; and
updating the plurality of captured images output in the content asset listing, wherein newest captured images of the first content asset and the second content asset are updated at different frequencies.

21. The method of claim 20, further comprising:
receiving a user selection of the first content asset in the content asset listing;
determining, based on the user selection of the first content asset, one or more content assets, in the content asset listing, similar to the first content asset; and
continuing to update captured images associated with the one or more content assets similar to the first content asset, while pausing updating of captured images associated with other content assets in the content asset listing.

22. The method of claim 20, further comprising:
receiving a user selection of the first content asset in the content asset listing; and
sending, to a server and based on the user selection of the first content asset, a request for:
   a first plurality of images captured for the first content asset, and
   a second plurality of images captured for a content asset that appears adjacent, in the content asset listing, to the first content asset.

23. The method of claim 20, further comprising:
receiving a user selection of the first content asset in the content asset listing;
sending, to a server and based on the user selection of the first content asset, a request for a video stream of the first content asset;
receiving, from the server, a quantity of images captured for the first content asset; and
while awaiting output of the video stream of the first content asset, causing output of the quantity of images captured for the first content asset.

24. The method of claim 20, further comprising:
receiving one or more indications of one or more popularities of the plurality of content assets;
determining, based on the one or more popularities, display resolutions of the plurality of captured images; and
causing output of the plurality of captured images at the determined display resolutions.

25. The method of claim 20, further comprising:
receiving a user selection of the first content asset in the content asset listing;
determining, based on the user selection of the first content asset, one or more content assets, in the content asset listing, similar to the first content asset; and
filtering output of the plurality of content assets in the content asset listing to the one or more content assets similar to the first content asset.

* * * * *

UNITED STATES PATENT AND TRADEMARK OFFICE
CERTIFICATE OF CORRECTION

PATENT NO. : 11,153,612 B2
APPLICATION NO. : 14/582290
DATED : October 19, 2021
INVENTOR(S) : Kiok et al.

It is certified that error appears in the above-identified patent and that said Letters Patent is hereby corrected as shown below:

In the Specification

Column 3, Detailed Description, Line 57:
Delete "110" and insert --111-- therefor Column 9, Detailed Description, Line 39:
Delete "(http://127.0.0.1:8080/" and insert --(http://127.0.0.1:8080/-- therefor Column 15, Detailed Description, Line 23:
Delete "netunix.max_dgram_qlen=4096)" and insert --net.unix.max_dgram_qlen=4096)-- therefor Signed and Sealed this
Twenty-fourth Day of October, 2023

Katherine Kelly Vidal
*Director of the United States Patent and Trademark Office*